United States Patent
Egner et al.

(10) Patent No.: US 7,358,854 B2
(45) Date of Patent: Apr. 15, 2008

(54) METHOD AND DEVICE TO IDENTIFY A PERIODIC LIGHT SOURCE

(75) Inventors: Sebastian Egner, Eindhoven (NL); Nicolaas Lambert, Eindhoven (NL); Kero Van Gelder, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 602 days.

(21) Appl. No.: 10/511,364

(22) PCT Filed: Apr. 1, 2003

(86) PCT No.: PCT/IB03/01279
§ 371 (c)(1),
(2), (4) Date: Oct. 14, 2004

(87) PCT Pub. No.: WO03/090493
PCT Pub. Date: Oct. 30, 2003

(65) Prior Publication Data
US 2005/0232642 A1    Oct. 20, 2005

(30) Foreign Application Priority Data
Apr. 19, 2002  (EP) ................................. 02076547
Oct. 8, 2002  (EP) ................................. 02079158

(51) Int. Cl.
*G08B 1/08* (2006.01)
*G08B 13/14* (2006.01)
*G08B 21/00* (2006.01)
*G08B 5/22* (2006.01)
*H04B 10/00* (2006.01)

(52) U.S. Cl. ................ 340/539.13; 340/572.1; 340/686.6; 340/825.49; 356/614; 356/615; 356/623; 398/140; 398/172

(58) Field of Classification Search ........... 340/539.13, 340/572.1, 686.6, 825.49, 635; 356/614–623; 398/140, 172, 151
See application file for complete search history.

(56) References Cited

U.S. PATENT DOCUMENTS

| | | | | |
|---|---|---|---|---|
| 3,714,432 A | * | 1/1973 | Jalink, Jr. | 250/340 |
| 4,523,291 A | * | 6/1985 | Giubbolini et al. | 708/309 |
| 4,679,144 A | * | 7/1987 | Cox et al. | 600/516 |
| 5,798,695 A | * | 8/1998 | Metalis et al. | 340/576 |
| 5,870,056 A | * | 2/1999 | Fowler | 342/424 |
| 5,877,565 A | | 3/1999 | Hollenbach et al. | |
| 6,297,742 B1 | * | 10/2001 | Canada et al. | 340/635 |
| 6,414,673 B1 | * | 7/2002 | Wood et al. | 345/173 |
| 7,002,489 B1 | * | 2/2006 | Denker et al. | 340/988 |
| 7,149,499 B1 | * | 12/2006 | Oran et al. | 455/404.2 |

* cited by examiner

*Primary Examiner*—Benjamin C. Lee
*Assistant Examiner*—Lam Pham

(57) ABSTRACT

In a device for location positioning, and more particularly, in a system for identifying an environmental source emitting a base frequency and waveform signal, a sensor (101) records an environmental source (105) emitting a base frequency and waveform signal, the signal being amplified (102), digitized (103), processed and compared (104) with a stored unique waveform characteristic. On the basis of the comparison result(s), location positioning and/or a device orientation may be determined.

16 Claims, 3 Drawing Sheets f = 100.06 Hz +/- 1.2516 Hz f = 100.02 Hz +/- 1.2506 Hz f = 75.89 Hz +/- 0.7201 Hz f = 99.39 Hz +/- 1.2349 Hz

METHOD AND DEVICE TO IDENTIFY A PERIODIC LIGHT SOURCE

BACKGROUND OF THE INVENTION

1. Field of the Invention

This invention relates generally to devices for location positioning and more particularly relates to a method for identifying an environmental source emitting a base frequency and waveform signal.

The present invention also relates to a system for performing the method and a computer program for performing the method.

2. Description of the Related Art

In various modern applications, it is essential for a device to know its location. Usually it suffices to know the room in which the device is located. This allows the application to be tailored to the location of a user of the device. This way, a so-called context-aware device is capable of adjusting its operations to fit the context in which the device is introduced. Context is any information that can be used to characterize the situation of an entity. An entity is a person, place, or object that is considered relevant to the interaction between a user and an application, including the user and application themselves. Almost any information available at the time of an interaction can be seen as context information. Some examples are:

spatial information—e.g., location, orientation, speed, and acceleration;

environmental information—e.g., temperature, air pressure, light, and noise level;

resources that are nearby—e.g., accessible devices, and hosts;

availability of resources—e.g., battery, display, network, and bandwidth; and physiological measurements—e.g., blood pressure, heart rate, respiration rate, and muscle activity.

A system is context-aware if it can extract, interpret and use context information and adapt is functionality to the current context of use. The challenge for such systems lies in the complexity of capturing, representing and processing contextual data. To capture context information, generally, some additional sensors and/or programs are required. To transfer the context information to applications and for different applications to be able to use the same context information, a common representation format for such information should exist. In addition, to being able to obtain the context-information, applications must include some "intelligence" to process the information and to deduce the meaning. This is probably the most challenging issue, since context is often indirect or deducible by combining different pieces of context information. E.g., if three persons meet in a certain office room at a certain time, it can mean that it is the weekly strategy meeting. Another situation would be when a context-aware application, such as a context-aware mobile phone, is placed in front of the user's personal computer at work, the application could then be given the information that the user do not wish to be disturbed with private phone calls.

There are features that are characteristic for context-aware applications. Firstly, information and services can be presented to the user according to the current context. This includes the selection of proximate information and services, and contextual commands. Secondly, automatic execution of a service may be performed when being in a certain context. This includes context-triggered actions and contextual adaptation. An example of the previous would be that when a user enters a specific room, his/her mails would be shown on a nearby terminal. An example of the latter would be the change on volume on a phone according to a current noise level.

A very evident type of application is the ability to find nearby resources. This can include input and output devices: printers, displays, speakers, facsimiles, video cameras, thermostats, etc. In pure service lookup, actually even no location information needs to be used. In situations where, e.g., distance calculations have to be done, location information of a device is required.

The usage of context information is still quite limited since it is very challenging and complex to capture, represent, and process contextual data. The most used types of context information are location, identity and time information. The context-aware application development is mainly concentrated around user interfaces, virtual and augmented reality, mobile, handheld and wearable computing. There are very few commercial products using context information yet, because of the challenges in this field.

There are several ways to obtain required location information. A variety of tracking systems exists, some of them based on the Global Positioning System (GPS) with which the location of a device can be determined. Systems for a positioning network, such as the GPS, are known for the purpose to locate virtually any place on the planet. However, such tracking systems are quite expensive which makes them unacceptable for low-cost consumer electronics. Other solutions involve the installation of positioning devices, such as GSM, DECT or Bluetooth beacons, etc. Furthermore it is known to adapt existing devices to act as sources of position information.

A lighting source can be modified to operate at a specific known frequency which can be detected by a device and transacted to a location. U.S. Pat. No. 5,657,145 discloses a method of transmitting coded data signals by modulating the output from light sources, e.g., electric lamps. The visible light wave is used as a carrier wave whereon the signals are transmitted. A wide range of digital information can be transmitted, such as audio and video content, etc. Of course, this modulation can also be used to identify the light source.

However, the light sources have to be modified to transmit the requested information and thereby be identified. It will, though, be advantageous not to modify ambient light sources for several reasons.

SUMMARY OF THE INVENTION

It is an object of the invention to provide a method for location positioning of a device without the need for modifying environmental sources.

It is further an object of the invention to provide a method for storing location parameters, which may be recovered for further processing.

This is achieved by a method (and corresponding device) for identifying an environmental source emitting a base frequency and waveform signal, the method comprising the steps of measuring the waveform signal of the source in a predetermined time-interval; estimating a the emitted waveform characteristic of the measured waveform signal; and determining a number of actions based on the estimated characteristic.

By omitting environmental source modifications, a positioning device according to the present invention may be more consumer-oriented, cause the lack of operational precautions. It may therefore be possible to quickly adapt a device according to the method of the present invention to a new environment without the need of installing sophisticated hardware. Therefore, the method of the present invention deals with recognizing environmental sources by their natural signal pattern without introducing a new pattern by artificial modulation.

Further, the method according to the present invention proposes to identify a "fingerprint" of an environmental source, e.g., a light source, and to store this fingerprint, which, in an embodiment of the invention, is a waveform of a light intensity, in memory. The fingerprint can then be used to, e.g., determine that the device has been in a given location before by use of information affiliated with data of the fingerprint. The affiliated information may be instructions to execute a number of actions, e.g., user notification, external device controlling, data acquisition, etc. If light sources are operating periodically, i.e., a source is fed by AC-voltage, not only the light intensity may be measured, but also a light waveform characteristic history can be derived by means of signal processing. Thereby, the method according to the present invention may be used to keep continuously track of a light source. Incandescent illuminations can be distinguished from fluorescent and LED-based light, etc. Moreover, the presence of a cathode ray tube can be detected and even distinguished by their characteristic refresh rate and phosphorescence. That is, no alterations of the light sources have to be performed. Thereby, the needs of a positioning device according to the present invention may be reduced to make use of natural properties of environmental sources only.

Environmental sources may moreover count apparatus emitting sonic signals, e.g., a fan emitting a characteristic humming sound, or electromagnetic radiation descended from an electric motor or an alternator, etc.

Information is stored in the device according to the present invention where the information may be associated to a number of waveform characteristics. The information may be any kind of data such as instructions, user input, data pointers, etc. A waveform characteristic may be defined to be a calculation based upon a frequency and a waveform of, e.g., a sampled light source. The light characteristic may, for example, be a spectrum analysis representative of the sampled signal. If a processed signal is periodic, a base frequency may typically be found. The found base frequency (the lowest valid signal frequency which represents the interval between the spectral bands which can be computed from the waveforms) may have relevance by comparing a set of signals. By knowing the base frequency, more efficient signal detection algorithms may be adapted to perform a signal comparison.

By performing autocorrelation on a periodic signal, any undesirable signals within may be suppressed. This is a well-known technique to suppress and sometime even eliminate undesirable noise to get a clean measurement signal. A further technique for cleaning a signal, i.e., noise cancellation, is by averaging a signal over a number of periods. Thereby, not only noise will be reduced, but also any potential sample errors during signal capturing, such as jitter, timing errors, etc., may be reduced significantly or eliminated. When a light intensity characteristic is calculated, it may be altered in amplitude, e.g., normalized, re-sampled, stretched in time, etc., to achieve a uniform, storable and comparable characteristic stature.

A base frequency of a digital sampled signal may be derived by use of Fast Fourier Transform (FFT), which is generally known to be a stable and efficient method; but other methods may alternatively be applied according to the type of sampled data. Since a FFT calculation sometimes does not output an accurately and acceptable result, in this case the base frequency, the FFT output may be refined by using a method comprising interpolation. This refinement typically increases reliability to an acceptable level of confidence.

After deriving a valid light intensity characteristic, a sample-by-sample comparison of this and a unique characteristic may be performed. The estimated characteristic typically consists of an averaged period of a discrete waveform. For comparison of two signals, it is often useful that the signals are phase aligned. Therefore, it may be advantageous to phase shift one of the signals to obtain phase synchronization. For this purpose, a ring buffer may be used. By rotating the buffer a requested number of samples, the two samples may be phase aligned. Thereby, a direct and simple sample-by-sample comparison may be applied. The two waveforms may be compared with respect to an offset value and/or deviation magnitudes to accept a wider range of near identically waveforms.

If an estimated waveform cannot be found acceptably identical to any already known stored waveform, it may be decided to accept greater deviations or, if necessary, to store the new and incomparable waveform as a new unique light intensity characteristic. Thereby, the number of recognizable and separate light intensity characteristics may be increased for future processing tasks.

BRIEF DESCRIPTION OF THE DRAWINGS

There and other aspects of the invention will be apparent from and elucidated with reference to the embodiments described hereinafter in conjunction with the drawings, in which.

DESCRIPTION OF THE PREFERRED EMBODIMENTS

Figure 1:
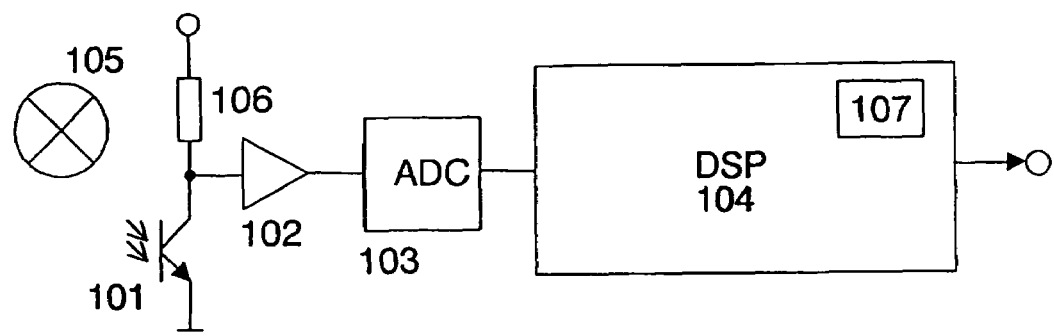
FIG. 1 illustrates an embodiment of the current invention for waveform detection, signal conversion and signal processing.

FIG. 1 illustrates an embodiment of the invention to identify an environmental source, in the following a light source. A phototransistor (101) is operated with a bias voltage by a pull-up resistor (106) in the linear region to pick up light emitted from ambient light sources. The phototransistor (101) output may be amplified (102) to feed an analog-to-digital converter (ADC) (103). The current measured by the ADC (103) may be proportional to the light intensity as long as the light is not too bright. A digital signal processing (DSP) device (104) may carry out computations for a signal-processing algorithm described in the following. Since most artificial light sources typically have operating frequencies of a few hundred Hertz, it is typically sufficient to sample the signal in the ADC (103) at a few thousand Hz. The workload for the algorithm in the DSP (104) is therefore moderate since signals of interest have a relatively low frequency. Thereby, it is possible to make use of inexpensive components which further is preferred for consumer-oriented products. To obtain a characteristic for a signal, it may be useful to identify a base frequency of the signal and, additionally, a waveform thereof. The signal processing method in the DSP (104) used to derive a light intensity characteristic, may therefore comprise the steps explained in the following. It is to be understood, that values in the following, such as the sample rate and sample length, etc., easily may be changed to fit a given embodiment.

1) The input signal from the ADC may be a Pulse Code Modulated (PCM) signal sampled at 8 kHz. The signal is partitioned into non-overlapping frames of N=2048 samples. Each sample is multiplied with a Gaussian window function to minimize spectral leakage. A Fast Fourier Transformation (FFT) is computed on the frame resulting in N spectral coefficients. Low and high frequency components (<10 Hz, >7 kHz) are removed by, e.g., a band-pass filter since these parts of the signal do not contribute to the signal being recognized. The spectral coefficient of maximal power is located, which provides a coarse estimate of the base frequency. Thereby, an indication of the expected frequency found in step 2 is to be found.

2) The same input signal as used in step 1 is used to improve the base frequency estimation. An estimation of the frequency corresponds to an estimation of the period, here in number of samples. For each potential period T in the confidence interval estimated in step 1, the average power of $x[k]-x[k-T]$ is computed, where $x[0], \ldots, x[N-1]$ are the samples of the frame. The location T of the minimal power is located by, e.g., second order interpolation. A frequency estimation like this is usually more accurate than a single sample interval by depending on choosing an appropriate size of the autocorrelation window.

3) The accurate estimation of the signal period T is used to extract the waveform of the periodic signal. This is done by splitting the input signal into non-overlapping frames, the k-th frame starting at round (k*T). The frames are averaged with a first-order low-pass filter resulting in an estimated waveform and a confidence interval for each position of the waveform. The low-pass filter used in this example is defined as $y[n]=(1-a) y[n-1]+a x[n]$, a=0.1. It is important that step 2 returns a sub-sample accurate estimation of T, because otherwise, the period would drift away and the averaging process would remove details of the waveform. By this averaging process, unwanted noise, e.g., flicker noise, thermal noise, etc., may be minimized to approach a cleaner signal.

4) The final processing step is to rotate the waveform within the frame such that it is positioned in a fixed relation to the period. For example, if the waveform is just only one peak, it should always appear at the same position. To find a fixed reference position within the waveform, the first non-DC coefficient of the FFT of the signal is calculated. The phase of this complex number indicates the phase-shift by which the waveform should be rotated back. The result of this method is a very stable waveform within the frame since it uses a global property of the waveform and not just a local feature such as the maximum.

In a preferred embodiment of the present invention, the algorithm reads a 8 kHz linear PCM sampled signal as input and outputs an estimation of the dominant frequency and waveform of the most powerful periodic signal rate at about 4 Hz, as the sampled signal is partitioned into non-overlapping frames of 2048 samples.

The amplifier (102) may comprise means to avoid overloading of the ADC (103) by the input signal. If the received light is too intense, the amplifier gain or, e.g., a signal compressor may be adjusted to overcome this. Likewise, the sampled signal may be normalized in the DSP (104) upon signal comparison to preserve comparable amplitude levels.

The DSP (104) preferably comprises a memory (107) for storing a number of calculated light intensity characteristics. It may be possible for the DSP (104) to compare two signal characteristics with a range of allowed deviation. In a preferred embodiment, the device further comprise means for recording, i.e., storing, a new calculated light characteristic, i.e., waveform.

Figure 2:
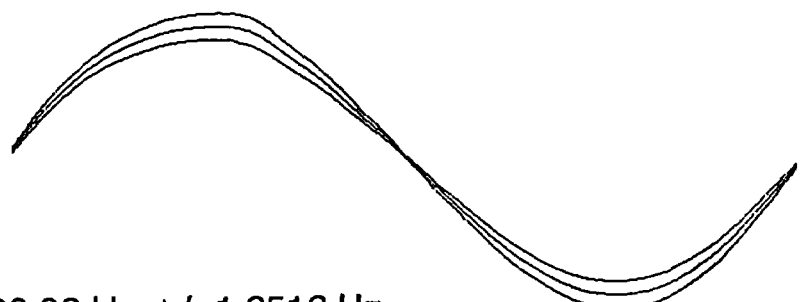
FIG. 2 shows a waveform of light emitted by an incandescent lamp provided with 50 Hz AC.

FIG. 2 shows a waveform of light emitted by an incandescent lamp provided with 50 Hz AC. Since the current provided oscillates with 50 Hz, the light modulation will be 100 Hz with a near sinus-shaped waveform. If the sampling frequency is 8 kHz like the above-mentioned embodiment and the window sampling window is of a size of 2048 samples, an averaging of the sampled signals may be applied by, for example, 10 periods, which is often plentiful for a valid signal approximation even in a heavily noised environment. Non-periodic signals, such as random noise, may thereby be virtually eliminated.

Figure 3:
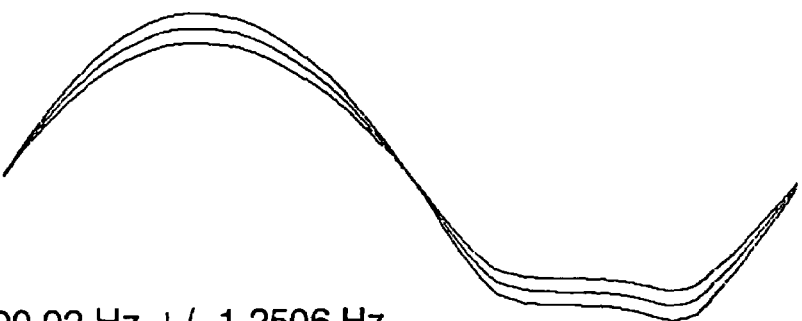
FIG. 3 shows a waveform of light emitted by a fluorescent lamp provided with 50 Hz AC.

FIG. 3 shows a waveform of light emitted by a fluorescent lamp provided with 50 Hz AC. Similar to the incandescent lamp, the modulated light frequency will be around 100 Hz but not smooth-curved in the same way as in FIG. 2, though. By sample-by-sample comparison of the sample waveforms for FIG. 2 and FIG. 3, respectively, a relative difference in the waveform shapes may be found. Thereby, the DSP may conclude that the two light characteristics hardly originate from the same source of light. It may, however, be concluded that the two waveforms are acceptable identical if, for example, no shape of more identical waveforms are stored. It is to be understood that the selection threshold may vary according to stored information.

Figure 4:
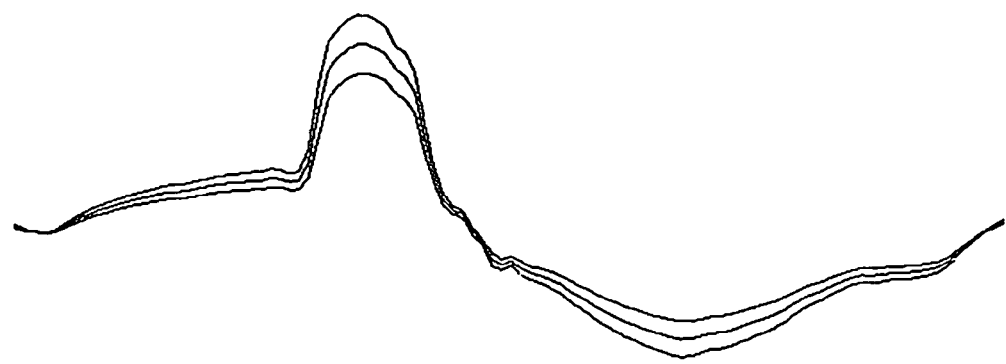
FIG. 4 shows a waveform of light emitted by a computer monitor with 76 Hz refresh rate.

FIG. 4 shows a waveform of light emitted by a computer monitor with 76 Hz refresh rate. The refresh frequency can be easily detected as a pulse having a shape dependent on the content of the display. Since the waveform length will be different from the 50 Hz supplied signals, a sample-by-sample comparison with the 76 Hz will not be necessary. By comparing the waveform lengths, it will show that the signals belong to different categories (100 Hz and 76 Hz, respectively).

Figure 5:
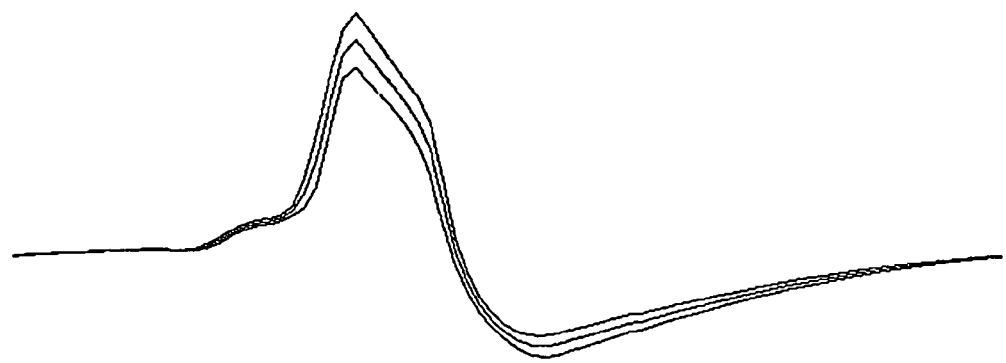
FIG. 5 shows a waveform of light emitted by a computer monitor with 100 Hz refresh rate.

FIG. 5 shows a waveform of light emitted by a computer monitor with 100 Hz refresh rate. Again, first the sample length has to be compared with waveform lengths stored in memory. The monitor operating by 76 Hz may therefore not be categorized with the new 100 Hz monitor signal, as the 76 Hz signal may be longer in number of samples. However, the waveforms in FIG. 2 and FIG. 3 may be categorized as possible identical waveforms in conjunction with the 100 Hz monitor signal. Next step may be the above-mentioned sample-by-sample comparison to unveil how closely the signals resemble. The comparing DSP algorithm may, e.g., tolerate deviations of frequency, waveform data, etc., to compensate for measuring and/or calculation inaccuracies.

Figure 6:
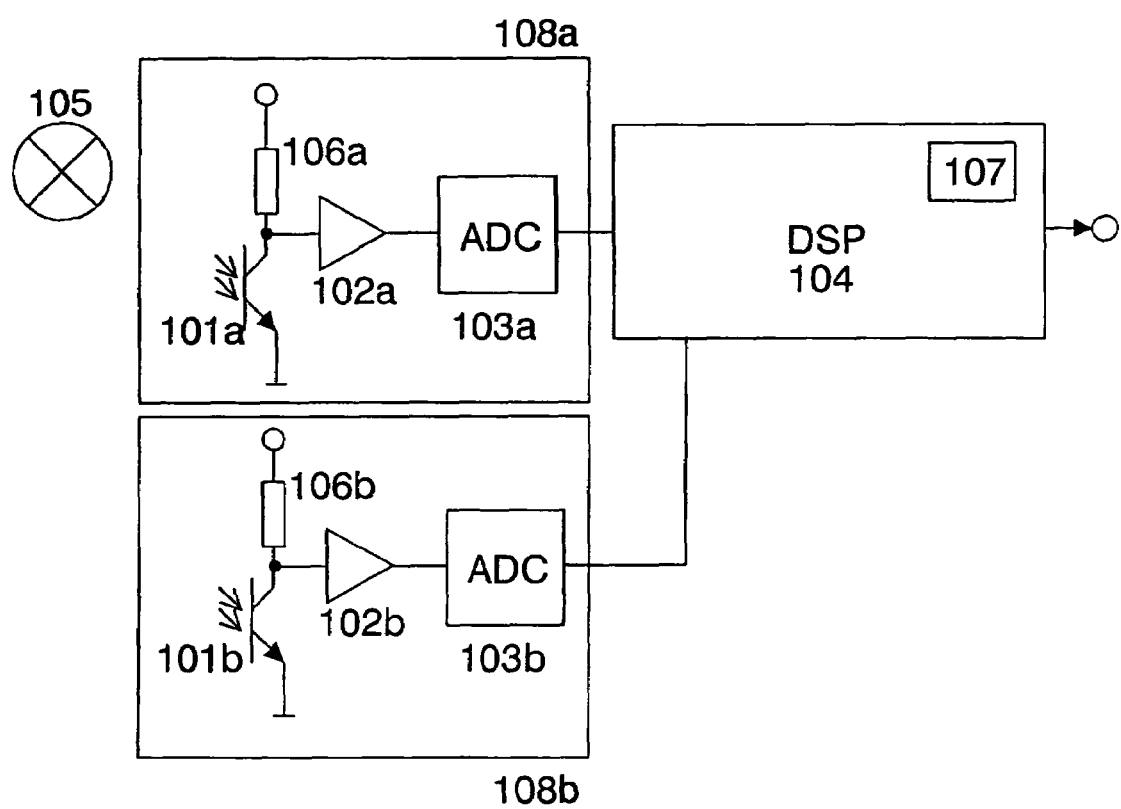
FIG. 6 illustrates an embodiment of the current invention for light detection, signal conversion and signal processing with two independent light detection circuits.

FIG. 6 shows another embodiment of the present invention, wherein the DSP (104) processes inputs from two light detecting circuits (108a, 108b) comprising pull-up resistor (106a, 106b), phototransistor (101a, 101b), amplifier (1021, 102b), and ADC (103a, 103b). By using two or more inputs, the relative orientation of a device may be determined in contrast to the use of only one light sensor. For this, it may be necessary to use detectors with different sensitivity characteristics. In contrast to a standard digital camera, this camera with just a few pixels is very fast in computing the direction and further, only sensitive to periodic light sources. A possible application for this is a pointing device that does not need a fixed reference as long as there are periodic light sources around.

There are several applications for the method according to the present invention to identify a "fingerprint" of a periodic light source, some of them described in the following:

"Been here before": The identity of a light source provides information about the location of the light detector. In particular, mobile devices equipped with a detector can recognize that the user is now in a room where he or she has been before by inspecting the room lighting or CRT screen available.

"Remember this": As before, but the detector is explicitly trained to remember a certain light source by pressing a 'record'-button. Then this source is uniquely identified among others. For example, a certain CRT can be found again. Or the light source has been specifically designed as a 'beacon', e.g., an infrared LED sending out a fixed bit sequence repeated periodically. The mobile device remembers this particular signature as a reference point.

"Orientation Sensor with arbitrary Reference Point": Since the method of this invention allows identifying an arbitrary periodic light source, it can be extended easily to locate the relative orientation of detector and light source. For this, it may be necessary to have several detectors with different sensitivity characteristics. After the joint signal of the detectors is locked to a periodic light source, its direction-of-arrival can be computed from a comparison of the relative intensity for the detectors. In contrast to a standard digital camera, this 'camera with just a few pixels' is very fast in computing the direction and only sensitive to periodic light sources (natural or planted on purpose). A possible application for this is a pointing device that does not need a fixed reference, as long as there are periodic light sources around.

"Suppress Periodic Interference": As a completely different application, the method of this invention can be used to suppress the main periodic signal from the signal coming from a light detector. For example, it is known that TL-lamps interfere with remote controls for consumer applications.

This is usually solved by modulating the remote control at about 30 kHz and applying a band-pass filter to the intensity signal. However, the power of the interference can be much larger than the communication signal. The method of this invention allows to predict the periodic interference and subtract it from the light signal to obtain a cleaner communication signal. It is even possible to use the predicted signal to adjust the preamplifier of the light detector to avoid overloading the detector.

"Quality Control for Lamps": Another different application is the quality control of lamps, either during fabrication or during use. Most common type of lamps produce periodic light where the details of the waveform are characteristic for properties of the actual source.

For example, TL-lamps close to their end of life show a significantly higher amount of flicker and noise. In the development of this invention, this deviation from nominal performance has shown clearly. Therefore, it should be possible to use it for service and maintenance by detecting lamps that are likely to fail in the near future. Currently, we do not know the actual dependency of residual lifetime and light pattern. This is subject to further investigation if seen as promising.

"Triggering Digital Scopes": Yet another application involves the signal processing method of this invention, without the light sensor part. An important and difficult part of digital scopes (to show electric signals) is the generation of trigger impulses. The method of this invention allows producing stabile triggering for periodic signals. This is an extension to existing trigger methods based on local features of the signal like 'peak-trigger' etc.

The uses of general-purpose microprocessors, instead of DSPs, are a viable option in some systems design. Although dedicated DSPs are well suited to handle signal-processing tasks in a system, most designs also require a microprocessor for other processing tasks such as route managing, etc. Integrating system functionality into one processor may be the best way to realize several common design objectives such as lowering the system part count, reducing power consumption, minimizing size, and lowering cost, etc. Reducing the processor count to one also means fewer instruction sets and tool suites to be mastered.

While the description above refers to particular embodiments of the present invention, it will be understood by someone skilled in the art that many of the details provided above are by way of example only, and modifications may be made without departing from the scope thereof.

The accompanying claims are intended to cover such modifications as would fall within the true scope and spirit of the present invention. The disclosed embodiments are therefore to be considered in all respect as illustrative and not restrictive, the scope of the invention being indicated by the appended claims, rather than the foregoing description, and all changes come within the meaning and range of equivalency of the following claims are therefore intended to be embraced therein.

The invention claimed is:

1. A method for determining a location of a device by identifying an ambient base frequency and waveform signal emitted by an environmental source in the vicinity of the device, the method comprising the steps of:
   measuring the waveform signal of the source in a predetermined time-interval;
   estimating the emitted waveform characteristic of the measured waveform, said estimating including estimating the base frequency;
   comparing the estimated waveform characteristics with stored waveform characteristics associated with various locations; and
   choosing the location based on said comparison.

2. A method according to claim 1, wherein said method further comprises the step of:
   if said comparison fails to identify a stored waveform characteristic, storing said estimated waveform characteristic as associated with a new location.

3. The method as claimed in claim 1, wherein a fast Fourier transform derives the base frequency of the estimated waveform characteristic.

4. The method as claimed in claim 1, wherein undesired signals included in said measured waveform signal are suppressed.

5. The method as claimed in claim 1, wherein the base frequency is refined by finding a maximum in an autocorrelation function of the estimated waveform characteristic.

6. The method as claimed in claim 1, wherein the estimated waveform characteristic is computed by averaging a number of estimated waveform characteristics.

7. The method as claimed in claim 1, wherein a phase shift is applied to the estimated waveform.

8. The method as claimed in claim 1, wherein the method allows locating a relative orientation of the device and the environmental source by use of two or more emission detectors.

9. The method as claimed in claim 1, wherein the method predicts and suppresses a specific periodic signal.

10. The method as claimed in claim 1, wherein the environmental source is a source emitting light.

11. The method as claimed in claim 1, wherein the environmental source is a source emitting sonic signals.

12. The method as claimed in claim 1, wherein the environmental source is a source emitting electromagnetic signals.

13. The method as claimed in claim 1, wherein the environmental source is a source emitting mechanical movement signals.

14. A system for determining a location of a device by identifying an ambient base frequency and waveform signal emitted by an environmental source in the vicinity of the device, the system comprising:

means for measuring the waveform signal of the source in a predetermined time-interval;

means for estimating the emitted waveform characteristic of the measured waveform, said estimating including estimating the base frequency;

means for comparing the estimated waveform characteristics with stored waveform characteristics associated with various locations; and means for outputting the associated location based on said comparison.

15. The system as claimed in claim 14 wherein said system further comprises:

means for storing said estimated waveform characteristic as associated with a new location if said comparison fails to identify a stored waveform characteristic.

16. A computer readable medium containing a program for making a processor carry out the method as claimed in claim 1.

* * * * *